April 30, 1935.  K. MAYBACH  1,999,366
CONTROLLING DEVICE FOR THE MAIN CLUTCH IN MOTOR VEHICLES
Filed Jan. 24, 1933   3 Sheets-Sheet 1

Inventor:
Karl Maybach

Patented Apr. 30, 1935

1,999,366

UNITED STATES PATENT OFFICE 1,999,366

CONTROLLING DEVICE FOR THE MAIN CLUTCH IN MOTOR VEHICLES

Karl Maybach, Friedrichshafen, Germany, assignor to Maybach-Motorenbau G. m. b. H., Friedrichshafen, Germany Application January 24, 1933, Serial No. 653,259
In Germany February 12, 1932

1 Claim. (Cl. 192—.01)

My invention relates to clutches in motor vehicles and has special reference to the main clutch usually arranged between the motor and the change speed gear in motor cars and the like.

Generally such a clutch is operated by means of a lever, preferably a foot lever, which acts against a spring. It has already been suggested to provide in addition means for declutching during a certain time period so as to allow free-wheeling of the vehicle, these additional means being in no direct connection with the usual foot lever for operating the clutch. They may be made up of mechanical members such as rods, levers and the like, also electrical elements may be provided for such purpose, but mostly pressure means, such as a liquid, pressure gas or vacuum are made use of.

In this latter case it is preferred to provide a pressure control member to be operated at will by the driver and to have the pressure or vacuum act on a piston in a cylinder or on a diaphragm, which in turn cause declutching and reclutching. The arrangement may also be made so that when shutting off the gas supply to the motor, which generally means taking the foot from the gas pedal, automatically the pressure control member is actuated thus causing de-clutching of the clutch. When the pedal is pressed down again the clutch automatically re-engages.

In arrangements of this latter kind it is usual to provide an additional member by which the automatically working free-wheeling means can be shut off at the will of the driver.

All these arrangements in which the clutch is more or less automatically operated have the great disadvantage that the engagement of the two clutch elements is not under the control of the driver and his feeling. Consequently shocks of heavier or feebler kind are unavoidable, even if the gas is given carefully and even if special means are provided for the purpose of having a smooth engagement. Such shocks are disagreeable for the people riding in the car and besides they lead to an increased wear of the clutch elements.

According to my invention I avoid such drawbacks by providing an additional device which acts so on the clutch elements to be engaged that their automatic engagement is prevented until these elements rotate at substantially equal speed of rotation. For this purpose I have a first member rotating in dependency of one of the two clutch elements and a second member which rotates in dependency of the second clutch element, and both members together influence a control member in such manner that this control member allows for engagement only after the two rotating members have come to substantially equal speed of rotation. Such rotating member may be for example centrifugal speed-responsive devices or the like. If two devices of this kind act against each other or parallel to each other there will be a certain middle position in which the control member on which they act for instance causes an aperture to be opened so as to allow for pressure or vacuum to pass and to leave the clutch elements free for engagement.

I prefer to provide liquid pressure pumps as primary members, one of which is driven by one of the clutch elements whereas the other pump rotates in dependency of the other clutch element. These pumps are to be of practically equal efficiency and are arranged in series so that one of them sucks out of the pressure space of the other. The pressure prevailing in this pressure space acts on the control member so that when the pressure vanishes (with substantially equal speed of rotation of the pumps) the control member allows the clutch elements to engage.

There are other objects of my invention but all will be understood best when having reference to the drawings which represent an example embodying my invention.

Figure 3:
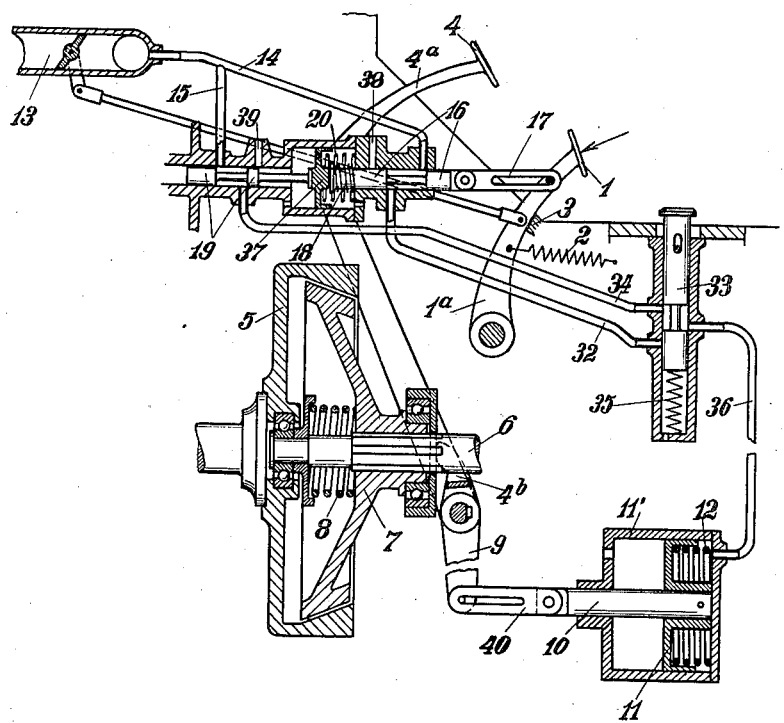
Figure 4:
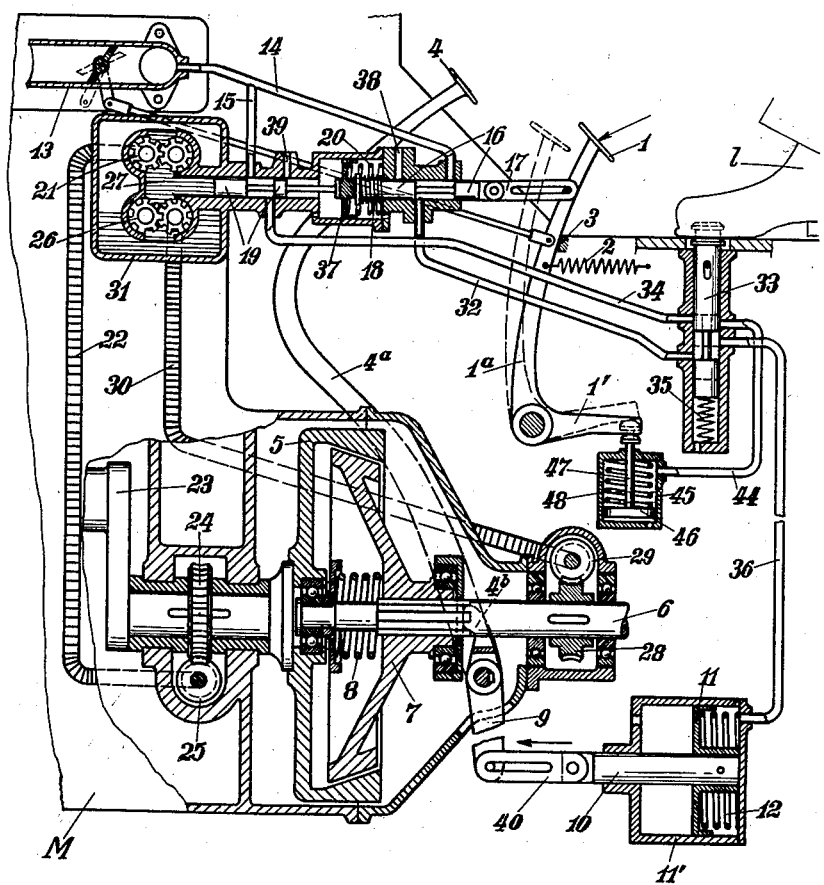

In Fig. 3 a third position is represented, and Fig. 4 shows an additional device incorporated in exactly the same manner.

The gas lever 1ª with pedal 1 in its rest position is held by means of spring 2 against a support or bracket 3. The clutch pedal 4 with its lever 4ª and arm 4ᵇ is adapted to press against clutch element 7 splined to shaft 6 which leads to the gear box and to the wheels of the car. The fly-wheel 5 of the motor M which is only intimated on the drawing forms the second clutch member adapted to engage with element 7 under the pressure of spring 8 when the pedal 4 is released.

Figure 2:
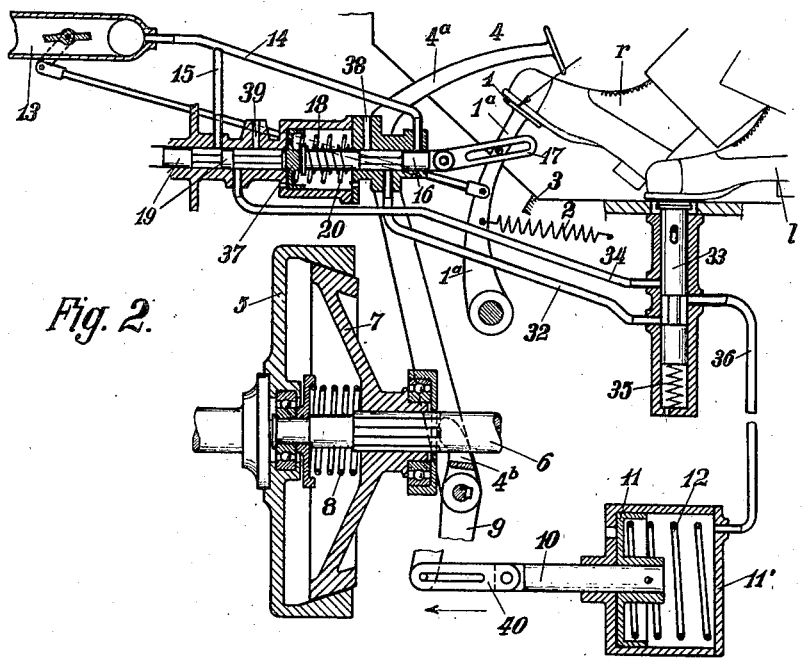
Fig. 2 shows the main elements of Fig. 1 but in different positions, also diagrammatically in section as in Fig. 1.

There is a piston 11 under the pressure of a spring 12 in a cylinder 11' adapted to cause declutching by means of piston rod 10, link 40 and the continuation 9 of lever 4ª whenever piston 11 is moved to the right, for instance by vacuum introduced by tube 36 and having its source in the motor intake at 13. If this vacuum is turned off, as shown in Fig. 2, spring 12 pushes piston 11 into its left hand position so that clutch spring 8 now is free to cause engagement of clutch elements 5 and 7.

Figure 1:
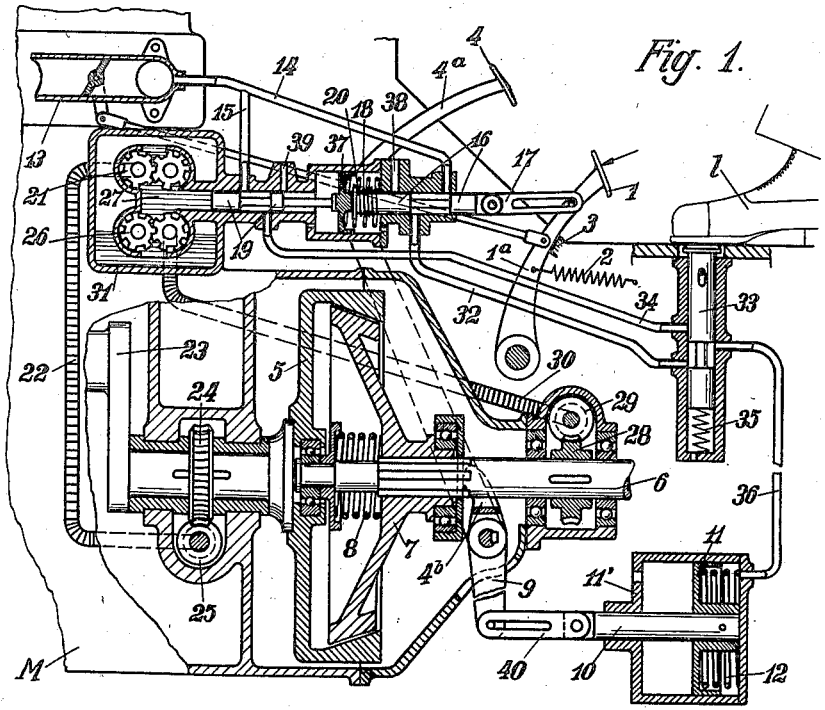
Fig. 1 is a diagrammatical longitudinal section through the friction clutch of a motor car and through the adjacent component parts of the entire arrangement, showing the clutch in released position.

The tube 14 coming from the intake 13 leads to piston valve 16 which in its right hand position as shown in Fig. 1 causes connection to tube 32. This right hand position of piston valve 16 is caused by the position of gas pedal 1 by means of link 17 against the pressure of spring 18 which tends to move valve 16 to the left.

Tube 14 has a branch tube 15 leading to a second piston valve 19 which generally is pressed to the left by means of spring 20 which surrounds spring 18 and presses on piston 37 abutting valve 19. But the liquid pressure existing in the space 27 intermediate pump 21 driven by the motor side of the clutch and pump 26 driven by shaft 6 to which clutch element 7 is splined acts on valve 19 against the action of spring 20. The pumps 21 and 26 are driven by flexible shafts 22 and 30, respectively, in any well-known manner, for instance by means of worms 25 and 29 and worm gears 24 and 28, respectively. The casing 31 surrounds the pumps 21 and 26 and contains a liquid, as oil or the like.

Tube 32 connects to a control valve 33 adapted to be operated by foot pressure against the action of spring 35 and to allow for connection of tube 36 with tube 32 coming from valve 16 or with tube 34 coming from valve 19. If the valve 33 is pressed down tubes 32 and 36 are connected and the vacuum in cylinder 11' is consequently controlled by valve 16, whereas when valve 33 is in its upper position tubes 34 and 36 are connected so that the vacuum in cylinder 11' is controlled by valve 19.

In spite of all these valves and connections the driver may at leisure disengage the clutch by means of the clutch pedal 4, because the slit in link 40 provides for such movement independently from the movement of piston 11.

The operation of the mechanism is as follows: When driving the driver normally has his left foot on the knob of valve 33 thereby causing connection between tubes 32 and 36. His right foot is on the gas pedal 1, as indicated in Figure 2. If from this state the driver releases the gas pedal the link 17 during the last part of the movement of lever 1ª draws valve 16 into its right hand position, as shown in Fig. 1. Consequently the vacuum created in the intake 13 is connected to the right hand side of cylinder 11' by means of tubes 14, 32 and 36, causing piston 11 to move to the right against the pressure of spring 12 and thereby disengaging clutch 5, 7 by means of rod 10, link 40 and lever 9.

The clutch remains disengaged until the driver gives gas again by depressing pedal 1.

During the period the clutch 5, 7 had been engaged the two pumps 21 and 26 driven by the motor shaft and by shaft 6, respectively, had equal speed of rotation. Therefore, there was no pressure in the intermediate space 27 and valve 19 was held in its left hand position by spring 20. When the clutch 5, 7 is disengaged by releasing the gas pedal 1 the motor will slow down to its normal idling speed and pump 21 which depends on the motor speed will slow down also. The car moves on and does not lose in speed in the same degree as the motor. Consequently, pump 26 pumps more liquid than pump 21 is able to pump, which means that a certain pressure is created within space 27 pressing valve 19 into its right hand position, as indicated in Fig. 1. The piston 37 prevents valve 16 from moving to the left even during the first period of acceleration when lever 1ª is pressed down, but with increasing motor speed pump 21 pumps more and more of the liquid pressed into space 27 by pump 26 and as soon as the pumps are on equal speed again or a short moment later the pressure within space 27 vanishes and spring 20 presses valve 19 back into its left hand position. Valve 16 under the pressure of spring 18 follows this movement, so that both valves are in the position shown in Fig. 2, in which tube 14 is shut off by valve 16 and tube 32 is connected to aperture 38. Consequently, the vacuum in the right hand side of cylinder 11' vanishes through tubes 36, 32 and aperture 38 and piston 11 by means of spring 12 is moved into its left hand position and causes re-engagement of clutch 5, 7 over rod 10, link 40 and lever 9, spring 8 constantly tending towards such engagement.

If the driver having removed his right foot from the accelerator removes his left foot (l) from the knob of valve 33, which means that he wants to stop free-wheeling and to have driving connection with the motor again, the engagement of the clutch 5, 7 is not caused immediately but only after the two clutch elements 5 and 7 have come to substantially equal speed of rotation.

In case the left foot (l) be removed while the other foot (r) is still pressing down gas lever 1ª, this would not mean any influence on clutch 5, 7 because the only alteration would be (Fig. 2) that tube 36 would be connected to tube 34 instead of to tube 32, both tubes being in connection with the open air by means of apertures 39 and 38, respectively, and in both cases the clutch would remain engaged. And if foot (l) is removed while pedal 1 is released also (Fig. 2), then it comes to the conditions represented in Fig. 3: Tube 36 is again connected to tube 34 instead of to tube 32 and as now tube 34, because of valve 19 being in its right hand position, connects to the intake 13 over tube 15 the vacuum causes the clutch 5, 7 to remain disengaged until operation of gas lever 1ª speeds the motor up so that both clutch elements 5 and 7 come to substantially equal speed, when they engage.

A very important additional device according to my invention is shown in Fig. 4. It is a piston 46 in a cylinder 45 which is under the action of spring 48 and the re-action of vacuum coming through tube 44 from control member 33. Piston rod 47 is adapted to press against arm 1' of foot lever 1ª, so that this foot lever is depressed whenever the control valve 33 is released, because then tubes 34 and 44 are in connection. But as the vacuum in tube 34 depends on the position of valve 19 there will be vacuum only as long as there is liquid pressure in space 27 (that is during different speed of rotation of the pumps). Consequently the gas pedal will be depressed automatically whenever the driver wants to abandon the free-wheeling state of the car (release of control valve 33) so that the motor increases in speed until because of equal speed of rotation the vacuum vanishes in cylinders 11' and 45, respectively, which means that the clutch elements 5 and 7 engage and that the automatic influence on arm 1' of the gas pedal ceases. Thus this new device is an automatically working accelerator which acts whenever the driver returns from free-wheeling to ordinary circumstances. This is of great advantage in driving a motor car especially when going down a slope in free-wheeling state and suddenly discovering that the slope becomes steeper, so that the driver intends to come back to ordinary driving conditions. In such case he has to do nothing but to release the control valve 33 and automatically the motor is raised in revolutions until the clutch elements rotate substantially at equal speed so that again automatically the clutch engages.

It may be advisable to make the arrangement so that the two pumps differ a little in their efficiency in such manner that the pressure in space 27 vanishes shortly before the clutch elements have come to equal speed of rotation so as to provide for retarding moments in the function of the entire mechanism.

I do not want to be limited to the details described or shown in the drawings as many variations will occur to those skilled in the art.

What I claim is:

In a motor vehicle in combination, a motor, a propeller shaft adapted to be driven by said motor; a clutch inserted between said motor and said propeller shaft; said clutch having an element in driving connection with said motor and an element in driving connection with said propeller shaft; a member for controlling the fuel admission to said motor; pressure means for engaging and disengaging said clutch for free-wheeling purposes; two rotatable members, one in operative connection with the motor, the other one in operative connection with the propeller shaft; a first control member for said pressure means, operating in dependency on both said rotatable members, adapted to prevent engagement of said clutch as long as its elements rotate at substantially different speeds; a second control member for said pressure means, operating under the influence of said fuel control member and under the influence of said first pressure control member and being adapted to cause disengagement of said clutch when the fuel admission is shut off; and a third control member for said pressure means to be operated at will and adapted to shut off alternately one of said first two pressure control members.

KARL MAYBACH.